US012544291B2

(12) United States Patent
Victor

(10) Patent No.: US 12,544,291 B2
(45) Date of Patent: Feb. 10, 2026

(54) PHYSICAL MANIPULATION APPARATUS AND METHODS OF USE AND MANUFACTURE

(71) Applicant: CHIRONGEN (PTY) LTD., Cape Town (ZA)

(72) Inventor: Adriaan Albertus Victor, Brackenfell (ZA)

(73) Assignee: CHIRONGEN (PTY) LTD., Cape Town (ZA)

(*) Notice: Subject to any disclaimer, the term of this patent is extended or adjusted under 35 U.S.C. 154(b) by 0 days.

(21) Appl. No.: 17/759,104

(22) PCT Filed: Jan. 20, 2021

(86) PCT No.: PCT/ZA2021/050002
§ 371 (c)(1),
(2) Date: Jul. 20, 2022

(87) PCT Pub. No.: WO2021/151126
PCT Pub. Date: Jul. 29, 2021

(65) Prior Publication Data

US 2023/0051049 A1 Feb. 16, 2023

(30) Foreign Application Priority Data

Jan. 20, 2020 (ZA) ................................ 2020/00355

(51) Int. Cl.
*A61H 1/00* (2006.01)

(52) U.S. Cl.
CPC ....... *A61H 1/00* (2013.01); *A61H 2201/1635* (2013.01); *A61H 2201/1645* (2013.01); *A61H 2201/165* (2013.01); *A61H 2201/169* (2013.01)

(58) Field of Classification Search
CPC ............. A61H 1/00; A61H 2201/1635; A61H 2201/1645; A61H 2201/165;
(Continued)

(56) References Cited

U.S. PATENT DOCUMENTS

| | | | |
|---|---|---|---|
| 2,112,184 | A | 3/1938 | Vogan |
| 2007/0118947 | A1 | 5/2007 | Lorenzo |

(Continued)

FOREIGN PATENT DOCUMENTS

| | | | |
|---|---|---|---|
| EP | 1060719 | A1 | 12/2000 |
| KR | 20060057136 | A | 5/2006 |

(Continued)

OTHER PUBLICATIONS

English translation for KR 20070079882 A (Year: 2007).*
(Continued)

*Primary Examiner* — Timothy A Stanis
(74) *Attorney, Agent, or Firm* — Hoffman Warnick LLC

(57) ABSTRACT

The invention provides a physical manipulation apparatus that is engageable with a skin surface of a human or animal subject. The apparatus may include a skin-engageable pad configured to conform to the morphology of a physical manipulation member such as a digit of a human therapist or a stylus tip of a chiropractic adjustment instrument. The skin-engageable pad may include a friction-inducing component in the form of a biomimetic dry adhesive. The apparatus may include a digit cover (110, 120, 130) configured at least partially to cover a human digit. Instead, the apparatus may be configured as a skin patch having two release liners superimposed, respectively, on opposite sides of the skin-engageable pad. The skin patch may include indicia arranged to indicate a required orientation of the skin patch relative to a targeted anatomical feature such as a spinal segment, or a required direction of movement of the manipulation member.

18 Claims, 5 Drawing Sheets

(58) Field of Classification Search
CPC ...... A61H 2201/169; A61H 2201/1253; A61H 2205/04; A61H 2205/081; A61H 1/008; A61H 23/06; A61H 37/00; A61H 39/00; A61H 39/04; A61H 39/08; A61H 7/001; A61F 5/30; A61F 13/02
See application file for complete search history.

(56) References Cited

U.S. PATENT DOCUMENTS

| | | | | |
|---|---|---|---|---|
| 2014/0302118 | A1* | 10/2014 | Kawamura | A61K 31/167 514/626 |
| 2016/0113834 | A1* | 4/2016 | Bring | A61H 7/007 601/134 |
| 2016/0120707 | A1* | 5/2016 | Ramirez | A41D 13/087 2/21 |
| 2016/0166467 | A1* | 6/2016 | Fujita | A61F 5/0102 606/204 |
| 2017/0361508 | A1* | 12/2017 | Carter | B29C 45/372 |
| 2019/0209420 | A1 | 7/2019 | Christoforou et al. | |
| 2020/0105157 | A1* | 4/2020 | Brock | G09B 15/026 |
| 2020/0306126 | A1* | 10/2020 | Carvalho | A41D 13/088 |

FOREIGN PATENT DOCUMENTS

| | | | |
|---|---|---|---|
| KR | 20140138561 | A | 12/2014 |
| KR | 20180117865 | A | 10/2018 |
| KR | 101916582 | B1 | 1/2019 |
| WO | 2017168140 | A1 | 10/2017 |

OTHER PUBLICATIONS

English translation for CN 110478211 A (Year: 2019).*
PCT International Search Report and Written Opinion for International Application No. PCT/ZA2021/050002, dated Mar. 29, 2021, 10 pages.
Extended European Search Report for Application 21744109.6, mailed Jan. 11, 2024, 11 pages.

* cited by examiner

PHYSICAL MANIPULATION APPARATUS AND METHODS OF USE AND MANUFACTURE

CROSS-REFERENCE(S) TO RELATED APPLICATIONS

This application claims priority from South African provisional patent application number 2020/00355 filed on 20 Jan. 2020, which is incorporated by reference herein.

FIELD OF THE INVENTION

This invention relates to physical manipulation of the human or animal body. It relates in particular, although not necessarily, to an apparatus and method for performing musculoskeletal manipulation of the human or animal body.

BACKGROUND TO THE INVENTION

Musculoskeletal manipulation is a type of therapy used by physiotherapists, chiropractors, osteopaths, orthopaedic surgeons, masseurs, masseuses and other physical therapists to treat musculoskeletal pain and disability, and to improve movement and posture.

Musculoskeletal manipulation can involve kneading and manipulating muscles. It can also involve joint mobilization and joint manipulation, therapeutic massage, palpation, and a variety of other "bodywork" therapies.

In the chiropractic field, musculoskeletal manipulation may be applied for pain management and to adjust misalignments of the spine. Chiropractic manipulation therapy may involve the manual application of gentle, yet firm, pressure to bones and joints. It may involve the administration of high-velocity, low-amplitude (HVLA) impulsive thrusts and pulling forces—referred to as adjustments—to spinal and other joints with the aim of restoring bones to their natural, or original, positions so that normal functioning can be established.

Spinal manipulation therapy ("SMT") is a variant of chiropractic manipulation therapy which focuses on the spine. The force administered must be enough to cause a so-called "gapping" of a targeted joint, that is, to cause slight separation of the joint surfaces before any tissue failure, injury, or damage occurs. The force must be precise in both magnitude and direction to produce effective adjustment and to reduce risks of associated side-effects and adverse events. To achieve enough force and an audible cavitation of a targeted joint, conventional chiropractic techniques rely on the use of broadened areas of contact between the chiropractor's hand and the patient's skin, as well as increases in leverage and in the amplitude and magnitude of the adjustment forces administered. In this context, leverage refers to the application of forces to other parts of a patient's body to increase tension in the targeted spinal segment before the SMT force is administered. However, while the use of longer levers and broader contact areas may increase the force of thrust manipulation, it may also compromise precision in magnitude and location, and can be tiresome to administer.

The specificity and efficiency of adjustments is correlated to the accuracy with which a practitioner engages a patient's bodily contact surfaces when delivering the thrusts. The adjustment force must be precise in magnitude, direction and location to be effective and safe, and to reduce the risk of adverse physiological events such as soreness, stiffness, muscle spasms, fractures and dislocations. However, improvements in accuracy may limit the degree of force that can be applied.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention there is provided a physical manipulation apparatus engageable with a skin surface of a human or animal subject, the apparatus comprising a skin-engageable pad configured to conform to a morphology of at least one physical manipulation member, wherein the skin-engageable pad comprises a friction-inducing component.

The friction-inducing component may be configured such that a coefficient of friction between the friction-inducing component and the skin surface is increased by increasing a pressure applied to the skin-engageable pad.

The friction-inducing component may comprise an adhesive. The adhesive may comprise a dry adhesive. The dry adhesive may comprise a fibrillary dry adhesive. Instead or in addition, the adhesive may comprise an adsorptive adhesive.

The physical manipulation apparatus may include at least one securing arrangement for securing the skin-engageable pad to the manipulation member. The securing arrangement may comprise an engagement formation configured to engage the skin-engageable pad with the manipulation member. Instead or in addition, the securing arrangement may comprise an adhesive layer.

The engagement formation of the securing arrangement may comprise at least one cover formation for at least partially covering the manipulation member. At least a portion of the cover formation may be rigid. At least a portion of the cover formation may be flexible.

Each cover formation may comprise a digit cover configured at least partially to cover a human digit. The digit cover may be configured to conform at least partially to the morphology of the digit. The digit cover may be configured to be worn on a human digit such as a finger. The digit cover may be configured to extend from an operatively distal region of the digit to an operatively proximal region of the digit.

The digit cover may be shaped, dimensioned and configured to conform substantially to a morphology of a distal phalanx of at least one of the following digits of a user: a first (V) digit or thumb (pollex); a third ($3^{rd}$) digit or middle finger; and a fourth ($4^{th}$) digit or ring finger.

The digit cover may include a fingertip sleeve configured at least partially to cover a fingertip of a user. The fingertip sleeve may include a distal pressing portion for receiving a distal phalanx of a user's finger, and a proximal support portion configured for receiving a middle phalanx of the finger. The two portions may be configured such that their principal axes are not co-axial but diverge from each other. Thus, the fingertip sleeve may have a curved or hooked configuration so that it may be worn comfortably over adjoined distal and middle phalanges of a curved finger.

A plurality of digit covers may be connected adjacent one another, thereby to provide an integrated manipulation unit.

Instead of a digit cover, the physical manipulation apparatus may instead comprise a stylus cover configured at least partially to cover a stylus of a chiropractic adjustment instrument.

The physical manipulation apparatus may include a pad-support structure upon which the skin-engageable pad may be mountable.

The physical manipulation apparatus may comprise at least one removable protective layer superimposed upon the skin-engageable pad. The protective layer may comprise a release liner or backing for covering at least a portion of the skin-engageable pad. The apparatus may have two release liners superimposed, respectively, on opposite adhesive sides of the skin-engageable pad.

The physical manipulation apparatus may be provided as a skin patch configured to be applied independently to the skin of a subject prior to manipulation, that is, in anticipation of being subsequently engaged and manipulated using a manipulation member such as a user's fingers or a tool. The skin patch may include a skin-engageable pad as described herein. The skin patch may be shaped, dimensioned and configured to guide and direct positioning and alignment of the skin-engageable pad of the skin patch with reference to a targeted or designated anatomical feature or landmark to be manipulated.

Whether the physical manipulation apparatus is configured to have a securing arrangement as described previously, or is provided as a skin-patch, the skin-engageable pad of the apparatus may include an adhesive layer or region arranged to oppose the friction-inducing component. The skin-engageable pad may comprise oppositely facing sides, each side bearing an adhesive layer or region. The opposed adhesive layers may be separated by an intervening carrier substrate.

The skin patch may include indicia. The indicia may comprise markings or shapes or configurations or combinations of these. Dimensions and configurations of the indicia may be preselected with reference to dimensions and surface anatomy of a targeted anatomical feature or landmark.

The indicia may be arranged to indicate a required orientation or alignment of the skin patch relative to a targeted or designated anatomical feature or landmark. The indicia may be arranged to indicate a required direction of movement of the manipulation member, such as a thrust or a pulling action. The indicia may be arranged to indicate a targeted or designated anatomical contact region to which the skin patch may be adhered in use.

The indicia may be provided on at least one of the release liners. Instead or in addition, the indicia may be provided on the skin-engageable pad of the skin patch.

According to a further aspect of the invention there is provided a physical manipulation kit which comprises a set of discrete physical manipulation apparatus as described above.

The kit may comprise a set of digit covers as described. The kit may include a pair of digit covers configured to conform at least partially to the morphologies of first and third digits of a hand. The kit may include a digit cover configured to conform at least partially to the morphology of a fourth digit of a hand.

The digit covers of the set may have predefined shapes, dimensions and configurations in a range adapted to fit the digits of users within a predetermined population group. The range may be based on criteria selected from the group consisting of hand anthropometry, biomechanical measurement studies, gender group (male or female), and combinations thereof.

The kit may include left and right sets of digit covers, with the digit covers of each set being configured to conform at least partially to the morphologies of digits on opposite, left and right hands.

In addition to the digit covers, or instead of them, the kit may include a set of skin patches as described herein.

The invention extends to physical manipulation tool comprising a physical manipulation apparatus as herein described, mounted on a device selected from the group consisting of instruments, implements, tools, levers, and other aids configured to administer physical manipulation. The device on which the apparatus is mounted may comprise a chiropractic adjustment instrument.

According to a further aspect of the invention there is provided a method of physically manipulating a body of a human or animal subject, the method comprising the steps of:

(a) adhering a skin-engageable pad to a skin surface of the subject;
(b) engaging a physical manipulation member with the adhered skin-engageable pad; and
(c) manipulating the pad and the adhered skin surface by moving the physical manipulation member.

The skin-engageable pad may include a friction-inducing component which is utilized in the step of engaging the physical manipulation member with the adhered skin-engageable pad to facilitate manipulation of the skin-engageable pad. The friction-inducing component may be configured such that a coefficient of friction between the friction-inducing component and a skin surface is increased by increasing a pressure applied to the skin-engageable pad. The friction-inducing component may comprise an adhesive. The adhesive may comprise a dry adhesive. Instead or in addition, the adhesive may comprise an adsorptive adhesive.

The skin-engageable pad may be configured to conform to the morphology of the physical manipulation member.

The skin-engageable pad may comprise oppositely facing adhesive layers or regions separated by an intervening carrier substrate to which the adhesive layers are fixed.

Each adhesive layer may have a release liner superimposed upon it thereby to provide a skin patch which comprises said skin-engageable pad and said release liners. The method may further include providing indicia on the skin patch, and the step of adhering the skin-engageable pad to the skin surface of the subject may include removing one of the release liners thereby to expose an adhesive layer of the skin-engageable pad for adhesion to the skin surface, orientating the skin-engageable pad relatively to a targeted anatomical feature of the subject with reference to the indicia provided on the skin patch, and contacting said exposed adhesive layer with the skin surface.

The method may include a step of adhering at least two skin-engageable pads to the body, each skin-engageable pad being adhered proximate to, and orientated relatively to, a respective one of a plurality of adjacent targeted anatomical features of the subject, then separately (and optionally successively) manipulating the targeted anatomical features by moving the manipulation member engaged with each adhered skin-engageable pad, thereby to cause a popping sound to emanate from each said adjacent anatomical feature. The adjacent targeted anatomical features may comprise adjacent vertebral segments of a spine of the subject.

The step of engaging the physical manipulation member with the skin-engageable pad may comprise securing the manipulation member to the skin-engageable pad.

The physical manipulation member may be as herein described. It may comprise a digit of a user. Instead, or in addition, the manipulation member may be selected from the group consisting of implements, tools, levers and aids configured for musculoskeletal manipulation.

The mode of physical manipulation may comprise musculoskeletal manipulation. Without limitation thereto, the musculoskeletal manipulation may be selected from the group consisting of chiropractic manipulation, massage, and palpation. The movement of the physical manipulation member may comprise a movement selected from the group consisting of chiropractic adjustments.

It will be appreciated that the chronological order in which steps (a) and (b) of the disclosed method are performed is interchangeable. Thus, the step of adhering the skin-engageable pad to the skin surface of the patient may be performed before or after the step of engaging the physical manipulation member with the pad.

The pad may be contacted with the skin surface proximal to a musculoskeletal landmark of the human or animal subject.

The disclosed method may include securing the skin-engageable pad to a distal end of at least one of a user's digits. The method may include securing a plurality of pads to a plurality of the user's digits.

The method may include securing at least one pad to at least one of the user's first ($1^{st}$), third ($3^{rd}$) and fourth ($4^{th}$) digits, palpating the subject's skin surface proximal to the targeted anatomical feature with a second ($2^{nd}$) digit of the user; and contacting the subject's skin surface with at least one of the pads secured to the user's other digit or digits.

According to a further aspect of the invention there is provided a method of manufacturing a physical manipulation apparatus, the method including the steps of:

- cutting a skin-engageable pad from a sheet of resiliently deformable laminate material comprising oppositely facing adhesive layers or regions separated by an intervening carrier substrate to which the adhesive layers are fixed;
- superimposing a release liner on each of the adhesive layers of the skin-engageable pad; and
- applying indicia to either or both the skin-engageable pad and at least one of the release liners, the indicia being configured to guide positioning and orientation of the skin-engageable pad relatively to an anatomical feature of a human or animal subject.

A friction-inducing component may be provided to serve as at least one of the adhesive layers. The friction-inducing component may comprise a dry adhesive as herein described.

The indicia may be as herein described.

The skin-engageable pad may be configured to conform to the morphology of a manipulation member engageable with the skin-engageable pad.

Embodiments of the inventions will now be described, by way of example only, with reference to the accompanying drawings.

DETAILED DESCRIPTION WITH REFERENCE TO THE DRAWINGS

Figure 1:
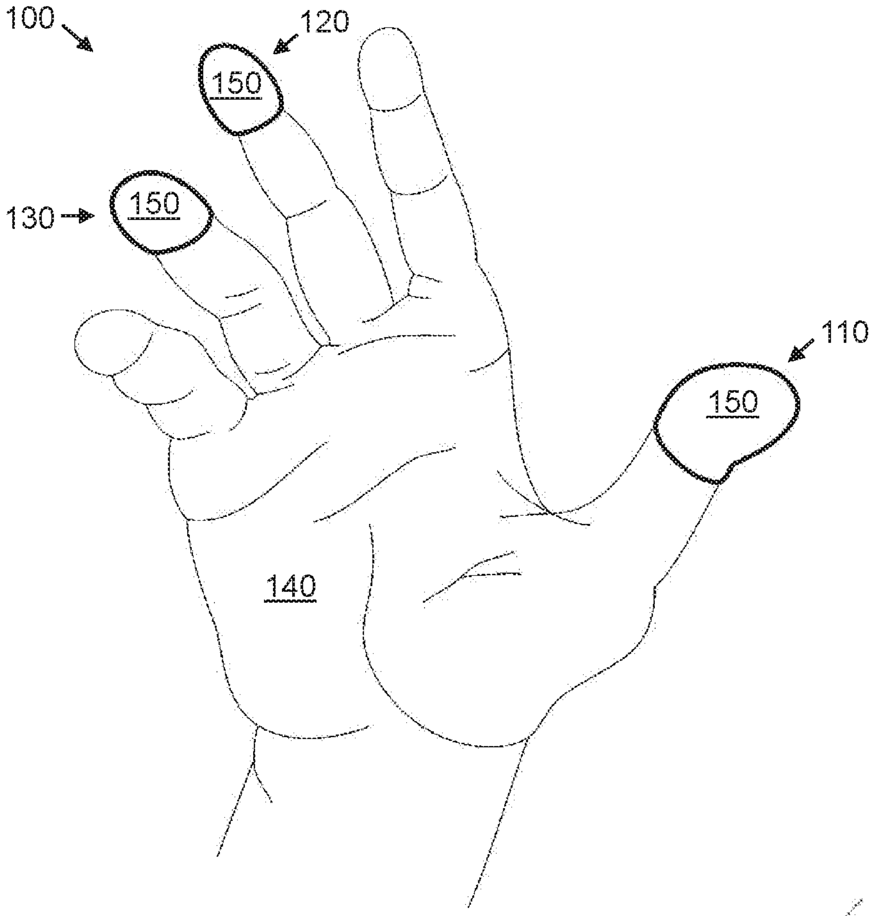
FIG. 1 is a three dimensional palmar view of a hand fitted with a physical manipulation apparatus according to an embodiment of the invention, the apparatus comprising a plurality of digit covers partially covering the palmar surfaces of the user's fingertips.

The figures illustrate various embodiments of physical manipulation apparatus for carrying out musculoskeletal manipulative therapy. The apparatus may provide a therapist with a means of increasing his or her grip on a patient's skin and musculoskeletal structure.

The apparatus may include a skin-engageable pad configured to conform to a morphology of at least one physical manipulation member. The skin-engageable pad may include a friction-inducing component configured such that a coefficient of friction between the friction-inducing component and a skin surface is increased by increasing a pressure applied to the skin-engageable pad.

The friction-inducing component may include a dry adhesive, otherwise referred to as a dry glue. The dry adhesive may be biomimetic. It may be based on adaptations of geckos' feet that allow geckos to climb sheer surfaces such as vertical glass. Synthetic equivalents may employ carbon nanotubes as setae on adhesive tape pads. The dry adhesive used in the disclosed apparatus may accordingly comprise a product mimicking or inspired by the footpads of geckos. Other biomimetic types of dry adhesives may be configured to mimic anatomical features of other species of animals, e.g. octopus' arms and suckers.

The dry adhesive may comprise a fibrillary dry adhesive. It may comprise fine setae, fibres, fibrils, hairs or tubes having micro-structures or nano-structures. The setae may have spatulate tips (spatulae). The setae and spatulae may be synthetic. They may be selected from the group consisting of nano-fibres, nano-tubes, micro-fibres, and micro-tubes. The setae and spatulae may be made of carbon. For example, they may comprise carbon nanotubes. They may be resiliently deformable and adapted to conform to the shapes of items or surfaces against which they may be pressed. Some dry adhesives of this type can provide adhesion of sufficient strength that, when attached to a glass surface, a piece of the adhesive material 4 mm by 4 mm may be able to support over 1600 grams when pulled roughly parallel to the surface.

The dry adhesive may be configured for reversibly establishing or inducing micro-vacuums between the adhesive and an engaged surface under application of force or pressure. It may be configured to be actuated by pressure. It may be configured to have variable and selective adhesion properties responsive to variations in pressure applied by a user, and in the direction of application of such pressure. Thus, the dry adhesive may be configured to have variable or switchable adhesive properties dependent upon varying magnitudes and directions of applied force or pressure.

Advantageously, the dry adhesive may be configured to be skin-friendly. The dry adhesive may have anisotropic properties. It may be configured to provide pressure-actuated and pressure-sensitive adhesive properties. It may be configured to provide reversible and bi-directional or multi-directional adhesive properties. It may be configured to provide controllable adhesive properties.

In an exemplary embodiment of the apparatus, and without limiting the generality thereof, the dry adhesive may comprise one or more products marketed as Setex GeckoGrip® and Setex GeckoTape™, available from nanoGriptech, Inc.

The dry adhesive may comprise at least one component selected from the group consisting of conductive nanoparticles, magnetic nanoparticles, electrostatic adhesives, electro-biomimetic substances. The skin-engageable pad may be electrically charged for additional grip capability.

The combination and proportions of dry adhesive components may be selected to promote and enhance grip applied by a manipulation member to the body of a human or animal subject.

Instead of the dry adhesive, or in addition to it, the physical manipulation apparatus may include an adsorptive adhesive such as a pressure sensitive adhesive (PSA, self-adhesive, self-stick adhesive) of a type used for double-sided tape or tape pads. The PSA may comprise a non-reactive, inherently tacky adhesive capable of forming a bond when pressure is applied to bond the adhesive with a surface. The PSA may comprise a viscous liquid which does not harden to a cohesively strong solid. The PSA may comprise an elastomeric polymer.

The skin-engageable pad may include a flexible carrier substrate to which the dry adhesive may be fixed. The dry adhesive may be fixed to the carrier substrate by any suitable means. It may, for example, be integrated with the carrier substrate, embedded in it or bonded to it. The carrier substrate may have a sheet-like configuration. It may comprise a foam carrier pad or tape made from a polymeric material.

The physical manipulation apparatus may include at least one securing arrangement for securing the skin-engageable pad to the manipulation member. In various embodiments of the apparatus, the securing arrangement may comprise engagement formations, or adhesive layers, or combinations of such arrangements. It will be appreciated that other types of securing arrangements may be suitable.

The apparatus may be configured to be used with a wide range of manipulation members or devices. For example, those skilled in the art will appreciate that chiropractors and other physical therapists make use of numerous conventional manipulation members to practise manipulation therapy. These may include the following parts of a therapist's anatomy, amongst others:

the fingertips the hypothenar eminence the thenar eminence the palmar and ulnar surfaces of the pisiform bone the broad dorsal-lateral surface of the 2$^{nd}$ digit including the intermediate phalanx, proximal interphalangeal joint and distal interphalangeal joint the broad dorsal-lateral surface of the 3$^{rd}$ digit including the intermediate phalanx, proximal interphalangeal joint and distal interphalangeal joint The skin-engageable pads may be configured for engaging with or covering any or all these manipulation members.

The manipulation member may instead be non-anatomical. Additional types of manipulation member may comprise components of devices selected from the group consisting of implements, tools, levers, massage devices, wearable items such as cots or gloves, and other aids configured for musculoskeletal manipulation.

For example, the manipulation member may comprise a component of a chiropractic adjustment instrument such as a mechanical force manual assisted (MFMA) instrument. An example of such an instrument is an Activator Adjusting InstrumentTM (AAI or "Activator"). AAI devices are hand-held, spring-loaded or electronic instruments capable of delivering controlled and reproducible mechanical forces (such as mallet actions or impulses) to the spine and other musculoskeletal structures. The manipulation member may comprise a stylus tip of an AAI device.

The physical manipulation apparatus may accordingly be supplied as a tool tip configured to fit on or over a component of one of the devices listed above. It will also be appreciated that the invention extends to such devices when equipped with a physical manipulation apparatus as herein described.

Two exemplary variants of the disclosed physical manipulation apparatus will now be discussed in detail. These variants may be referred to as digit covers and skin patches.

Digit Covers

Figure 2:
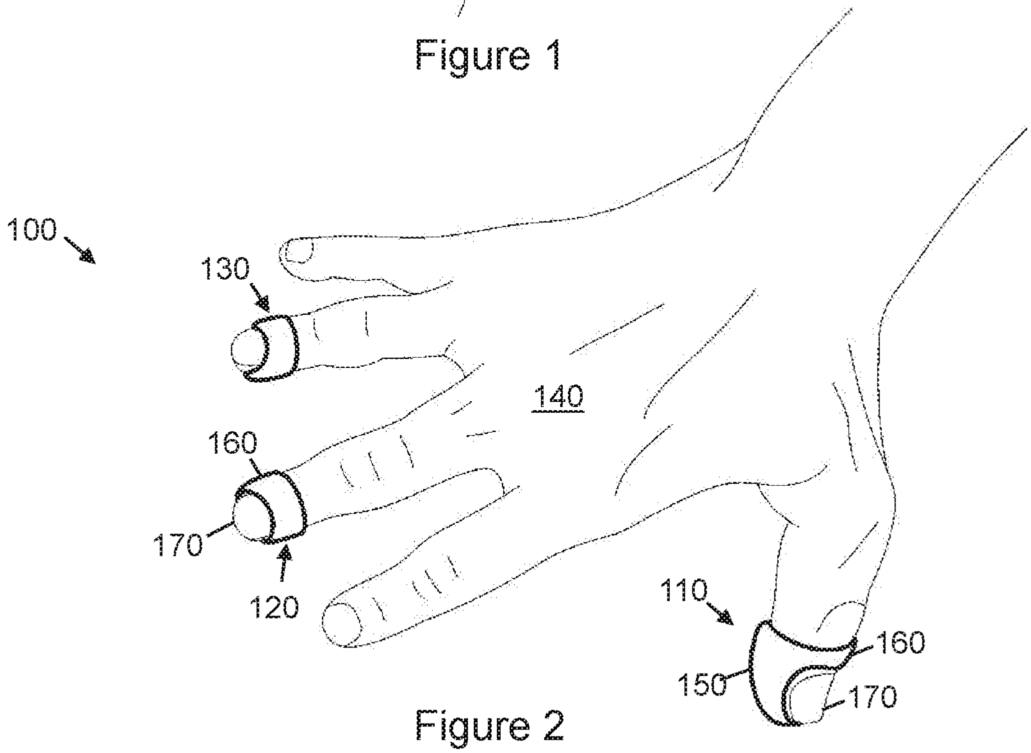
FIG. 2 is a three dimensional dorsal view of the apparatus of FIG. 1, illustrating the digit covers partially covering the dorsal surfaces of the user's fingertips.

FIGS. 1 and 2 illustrate an embodiment of the physical manipulation apparatus in which the skin-engageable pads are provided as components of digit covers configured to be fitted over and held securely on the fingertips of a user.

Reference numeral 100 indicates a set of digit covers (110, 120, 130). The digit covers are shaped, dimensioned and configured to be worn respectively on the distal phalanges of the first (1$^{st}$) digit or thumb, the third (3$^{rd}$) digit or middle finger, and the fourth (4$^{th}$) digit or ring finger of a user's hand (140). The digit covers are configured to conform comfortably to the morphologies of the corresponding phalanges on which they are worn.

The digit covers (110, 120, 130) may each comprise a skin-engageable pad (150) and a securing arrangement configured to secure the skin-engageable pad (150) to a fingertip of a user. In the embodiment shown, the securing arrangement comprises a fingertip sleeve (160). The fingertip sleeve (160) may define an aperture on a dorsal region configured to expose the fingernail (170) of the relevant finger. For the digit cover (110) configured to be worn on the thumb, the aperture may be larger than the respective apertures of other two digit covers (120, 130).

The skin-engageable pad of each digit cover may conform generally to the morphology of a human fingertip and may include an outwardly facing layer of dry adhesive.

Each skin-engageable pad may be configured to provide high-friction engagement with the skin of a patient, thereby promoting grip between the therapist's fingertips and the patient's body in use. The dry adhesive may be configured to deliver selective adhesion in response to varying pressures and directions of force applied by the therapist. In use of the apparatus, this property may enable a therapist to detach his or her fingertips from a targeted patch of skin as necessary, following the administration of therapy using that patch.

Each digit cover (110, 120, 130) may be configured at least partially to enclose a distal region of its respective digit. The digit cover may be configured to extend from an operatively distal tip region of a distal phalanx of a finger, to an interphalangeal joint region of the finger. The digit cover may accordingly be configured at least partially to enclose the fingertip. It need not necessarily be configured fully to enclose the fingertip. It may define at least one aperture in a region not required to be engaged with the skin of the human or animal subject, such as an upper or dorsal region of a finger.

The digit covers may each be opaque, transparent or translucent.

Although not shown in the drawings, each digit cover may comprise a pad-support structure, upon which the skin-engageable pad may be mountable. The pad-support structure may be configured as a platform structure. The platform structure may define an operatively downwardly facing, planar pad-mounting surface onto which the skin-engageable pad may be mounted for use. Since the surface area of a user's finger pad may be too small to provide a preferred degree of adhesion for a given force applied, the usable footprint or contact area of the skin-engageable pad may be increased by having the platform structure present. The platform structure may afford an area larger than that of a typical fingertip pad, permitting a larger area of skin to be manipulated with a given finger. Adhesion of the skin-engageable pad to a patient's skin may thus be increased and enhanced in use.

Instead of being shaped like a platform, the pad-support structure may have a convex or generally bowl-shaped configuration, approximating the shape of an end region of the finger or other manipulation member. For example, it may have the approximate shape of a fingertip, or of the stylus tip of a chiropractic adjustment instrument. It may therefore assist in conforming the skin-engageable pad to the morphology of the manipulation member in use. In such embodiments a mounted skin-engageable pad may then curve operatively forward and around the end of the fingertip or stylus tip, as well as operatively laterally around its opposed sides.

The pad-support structure may be integral with the fingertip sleeve of the digit cover or connected to it.

Some components of the digit covers may be reusable whilst others may be disposable and replaceable. The fingertip sleeves and pad-support structures may be configured to be reusable, for example. On the other hand, the skin-engageable pad may be configured to be disposable and replaceable. A disposable pad may be adhered to the pad-support structure for a single use event. After use of the pad it may be removed from the pad-support structure and discarded. It may then be replaced by adhering a fresh pad to the pad-support structure. In other embodiments the skin-engageable pad may be intended not to be discarded. It may form an integral and permanent part of the digit cover.

Digit covers may be manufactured in a variety of shapes. In certain exemplary embodiments of the apparatus, the digit covers may be configured to fully enclose a digit, but in others—such as those shown in the drawings—they may be configured only to enclose a part of a distal phalanx of a digit.

In preferred embodiments of the apparatus, a plurality of digit covers may be supplied as a kit or set, with each cover being configured to be worn on a different finger, or over a different surface area of a hand. A set of the digit covers may include covers that are configured to receive and partially surround the distal phalanges of a user's first ($1^{st}$) and third ($3^{rd}$) digits. Optionally, the set may further include a digit cover configured to receive and partially surround the distal phalanges of a user's fourth ($4^{th}$) digit. Inclusion of a cover for the fourth digits of the user's hands may be advantageous for promoting zygapophyseal and vertebral joint manipulation.

The digit covers can each be configured such that, when worn on the digit of a user, the skin-engageable pad of a digit cover is positioned over a ventral or palmar surface of the digit on which it is worn, so that the dry adhesive faces away from the digit. The palmar surface of a hand will be understood to mean the grasping side of a hand.

Each digit cover may have a configuration selected from the group consisting of fully or partially enclosed finger cots, finger sleeves, finger frocks, finger stalls, fingertip covers, finger gloves, fingertip grips, thimbles, gloves, and mittens. The digit covers may therefore be configured as thimble-like covers for covering the fingertip, or as cot-like covers for enclosing substantially the entire finger or fingers. The digit covers may each have a generally tubular configuration with an open end and a blind end.

Although individual digit covers are shown in the drawings, in some embodiments a plurality of the digit covers (typically a pair) may be connected adjacent to each other, thereby to provide an integrated manipulation unit. Such a configuration may permit the unit to be worn on two or more fingers simultaneously, thereby promoting support and stability and permitting the application of larger forces than could be achieved using a single finger.

As a result of the enhanced grip strength and specificity which may be achieved by using the described apparatus, it may allow therapists more frequently to use their fingertips as manipulation members. This may at least partially address a shortcoming of conventional chiropractic techniques, which rarely involve the use of the tips of the fingers.

It will be appreciated that numerous other configurations and dimensions of the securing arrangement are feasible, such as fully-enclosed cots without apertures, finger sleeves extending further down the length of the digits, gloves, bindings, hook-and-loop fasteners, snap-locking fasteners, adhesive layers, double-sided adhesive tape (with or without carrier substrate), clasps, dimples and the like.

The digit covers may be configured to receive digits of either or both the right hand (140) and the left hand of a user. In some embodiments, the digit covers may be configured to be used interchangeably on either hand of a user.

The securing arrangement for securing the skin-engageable pad to the manipulation member may be configured to provide structural support for the apparatus and for the manipulation member during use. Each digit cover may, for example, include at least one stiffening brace (not shown). The digit covers may each include superior-inferior levers (above and below in the operatively vertical plane) and bilateral levers (on both sides in the operatively horizontal plane). This may reduce the likelihood of the digit cover falling off the human digit during use, and provide structural support to limit flexing of the digit cover and reduce fatigue in a therapist's fingertip joints during fingertip manipulative therapy.

The braces and levers may act to stabilise adjoining components of the fingertip sleeve relative to each other. In the case of the two-part fingertip sleeves having a hooked configuration, the braces or levers may support the distal pressing portion and the proximal support portion of the sleeve in their angular orientation relative to each other.

The securing arrangement may also include one or more resiliently deformable, digit-gripping clasps (not shown) configured to bias the digit cover against the finger over which the cover may be placed. The clasps may be gapped for flexibility relatively to each other. In use, the clasps may reduce the likelihood of the fingertip sleeve falling off the finger especially during the application of force.

The braces, levers and clasps may be provided on one or both sides of a digit cover. They may be connected to each other so that they can maintain a sustained gripping force against the finger.

In further embodiments of the physical manipulation apparatus (not shown), the disclosed physical manipulation apparatus may be provided as a glove or mitten. In such embodiments the skin-engageable pads may be provided as components of the glove. Such gloves may be shaped, dimensioned and configured to cover a portion of a user's hand. The skin-engageable pads may be provided on the finger tubes of such gloves, and optionally also on portions of the glove that are intended to cover other parts of a wearer's hand, such as the wearer's pisiform pad.

In some cases, the skin-engageable pads may be provided as self-adherent pads. Rudimentary embodiments the physical manipulation apparatus may require only a skin-engageable pad comprising a thin layer of the dry adhesive material embedded in a flexible carrier substrate such as a film or tape or a piece of foam pad. The carrier substrate may form the basic structural element of the skin-engageable pad. Such embodiments may simply be adhered to a user's fingertips and then engaged with a patient's skin, or vice versa.

Skin Patches

The disclosed physical manipulation apparatus may comprise generally planar skin patches, tapes, films or mats having skin-engageable pads. Each skin patch may be shaped, dimensioned and configured so that it may be adhered to the skin of a subject on one side and engaged by a manipulation member (such as a therapist's fingers or an AAI stylus) on the other side.

The skin-engageable pad of each patch may comprise a flexible, sheet-like carrier substrate or foam pad having opposed adhesive sides. One of the adhesive sides may include a dry adhesive. In certain embodiments, however, both sides of the skin-engageable pad may be provided with adsorptive adhesives. However, the embodiments incorporating dry adhesive may be advantageous insofar as they may permit quicker release of a therapist's finger from the pad.

Advantageously, although not necessarily, the side with the dry adhesive may be the operatively upper or outer side of the patch, so that the dry adhesive may be engaged with a therapist's fingertip or other manipulation member.

Rudimentary embodiments of the skin patches may be unmarked. However, additional functionality of the patches may be obtained by shaping, dimensioning, configuring and marking them to provide guidance and direction to a therapist regarding their intended purpose, application, positioning, alignment and other aspects of their use. The skin patches may therefore include indicia comprising markings or shapes, or both.

The shapes, dimensions, configurations and markings of the skin patches and their indicia may be preselected to meet requirements of established techniques within the branch of therapy in which a given embodiment of the skin patch is to be used. They may, for example, be preselected in accordance with established and recognised chiropractic and spinal manipulation therapy techniques. They may be based on the anatomical dimensions, surface anatomy and biomechanics of specific regions of a spine being targeted. Biomechanical factors may include the distribution of forces across the targeted spinal segments and tissues, as well as facet joint gapping and tissue loading.

The shapes, dimensions, configurations and markings of the skin patches and their indicia may furthermore be preselected to ensure that costs associated with the manufacture of each embodiment of the skin patch will permit said skin patch to be sold within a price range that is competitive with other apparatus and methods available in the branch of therapy in which the given embodiment of the skin patch is to be used.

In use of the skin patches, their features of shape, dimension, configuration and marking may be employed, inter alia, to guide and direct the positioning, orientation and alignment of the skin patches relative to anatomical features and landmarks, and/or to indicate regions for contact between the subject and the therapist's finger (or other manipulation member), and/or to guide and direct the application of force to anatomical features of the subject.

The indicia may, for example, be arranged to indicate a targeted anatomical contact region where the skin-engageable pad may be contacted with the skin of a subject. The indicia may instead or in addition be arranged to indicate suitable contact regions where the skin-engageable pad may be contacted with a manipulation member.

The orientations and contact regions referred to above may be based on dimensions and surface anatomy of the targeted anatomical landmark or feature in respect of which a given skin patch is intended to be used.

The indicia may be arranged to direct thrust or pulling actions to be performed with the manipulation member. The indicia may accordingly be configured and dimensioned to indicate either or both a direction or magnitude of required application of pressure or force to the skin patch for purposes of carrying out a required physical manipulation or adjustment of a targeted anatomical feature.

The skin patches may each have a laminate structure. The skin-engageable pad with the opposed adhesive sides may be sandwiched between a pair of release liners.

The indicia may be provided on at least one of the release liners. Instead or in addition, the indicia may be provided directly on the skin-engageable pad.

The indicia may have shapes, dimensions and configurations preselected with reference to dimensions and surface anatomy of a targeted anatomical feature (such as a spinal segment) and in accordance with spinal manipulation therapy techniques.

Without limitation thereto, the targeted anatomical feature may be selected from the group consisting of cervical spine segments, thoracic spine segments, lumbar spine segments, sacroiliac joints, costovertebral joints, costotransverse joints, zygapophyseal joints, ankles, knees, hips, shoulders, elbows, wrists, jaws and temporomandibular joints.

In use of the apparatus, the indicia may facilitate and direct a therapist in the administration of high-force spinal manipulation therapy (SMT), by funnelling or steering the applied force to converge towards a targeted segment or spinal facet joint of the spine. This may address shortcomings of conventional high-force spinal manipulation therapy, wherein the applied force can disperse across several segments of the spine.

The skin patches may promote precision in the force and velocity of thrust actions delivered to the targeted anatomical feature.

Figure 3:
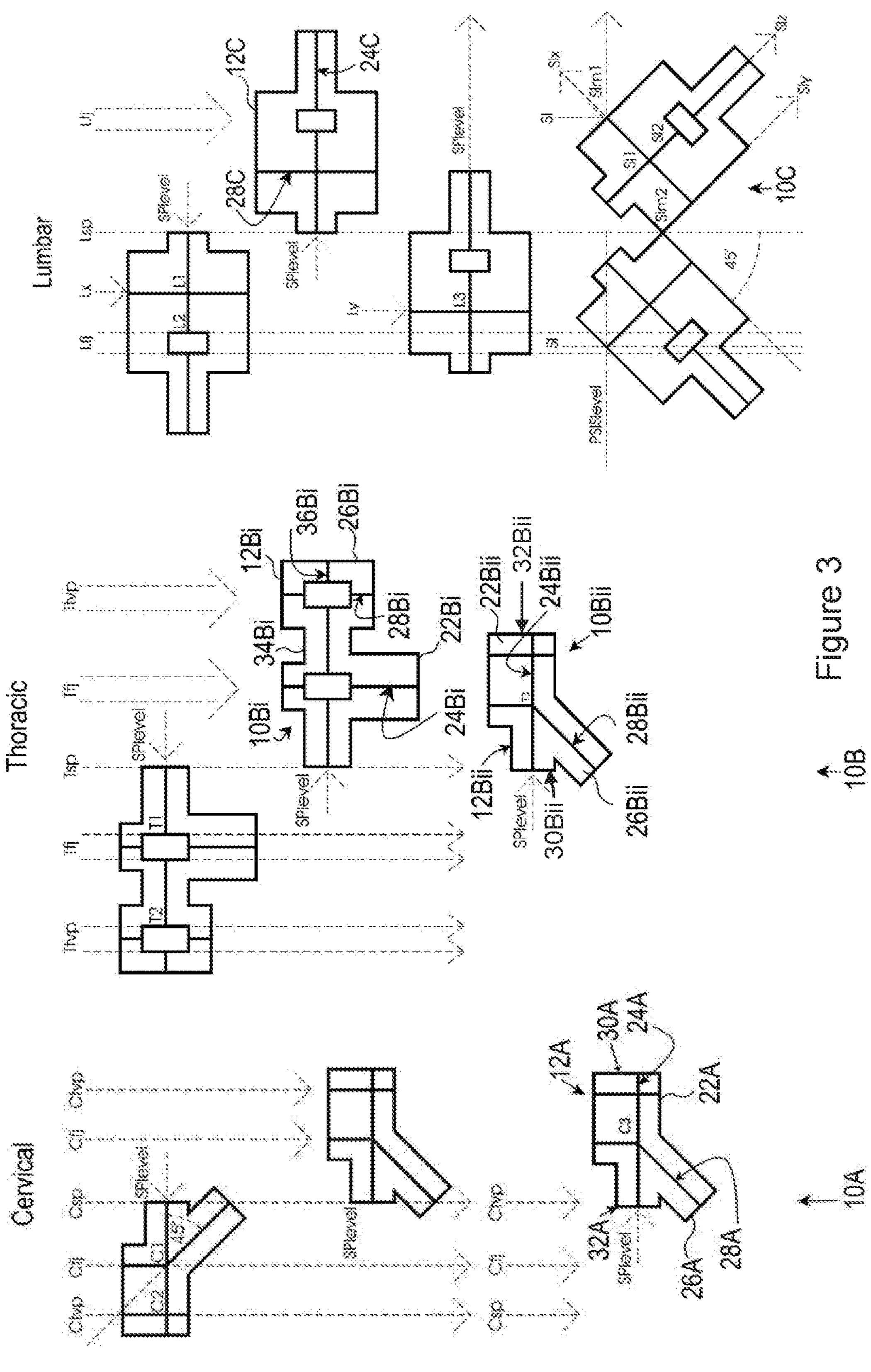
FIG. 3 is a plan view of a set of physical manipulation apparatus configured as skin patches or tapes, shown in varying orientations relative to a target spine.

FIG. 3 shows a set of skin patches (10A, 10B and 100) which each designate and are configured to be applied proximate to specific spinal segments selected from the group consisting of cervical spinal segments, thoracic spinal segments (and costotransverse joints), and lumbar spinal segments (and sacroiliac joints).

In FIG. 3 the following abbreviations have the following meanings:

SPlevel: marks the level of spinal segment in horizontal plane

Csp: cervical spinous process/midline in vertical plane

Cfj: cervical facet joints/articular pillar in vertical plane

Ctvp: posterior tubercle of cervical transverse process in vertical plane

Figure 4:
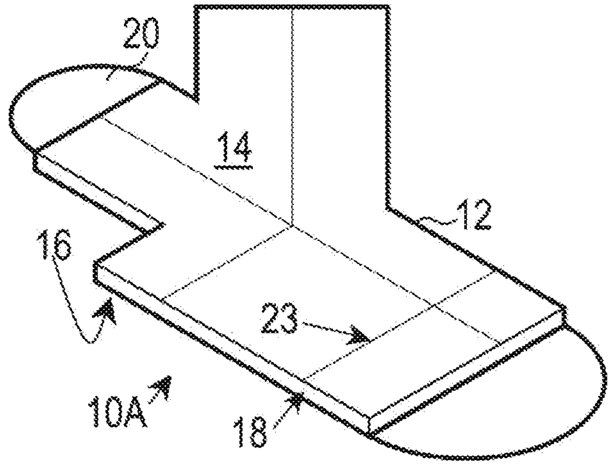
FIG. 4 is a perspective view of a skin patch in the set of FIG. 3 which is designated for application in proximity to a cervical spine segment.
Figure 5:
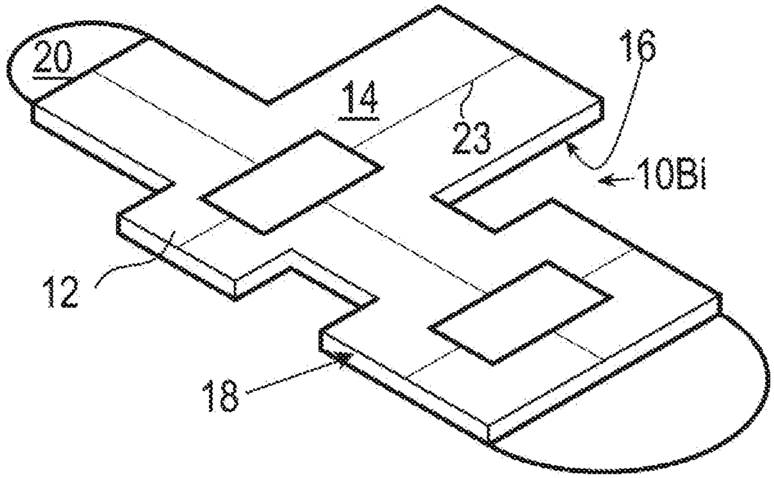
FIG. 5 is a perspective view of a skin patch in the set of FIG. 3 which is designated for application in proximity to a thoracic spine segment.
Figure 6:
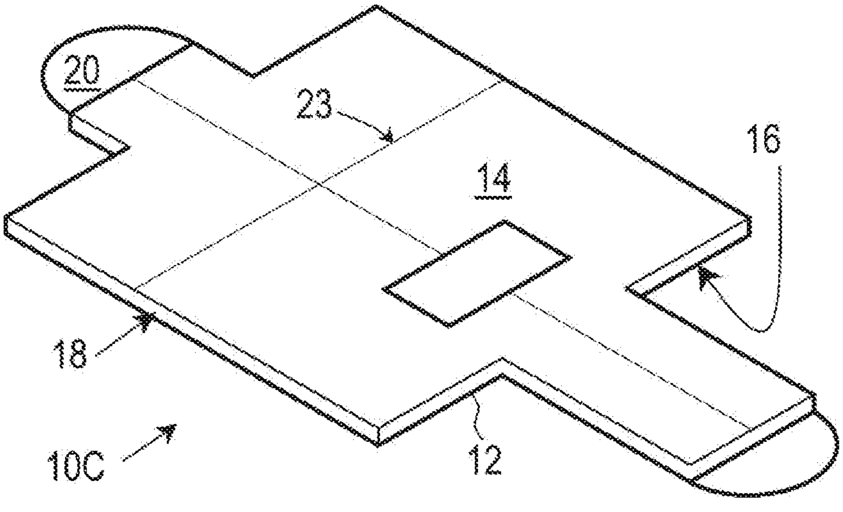
FIG. 6 is a perspective view of a skin patch in the set of FIG. 3 which is designated for application in proximity to a lumbar spine segment.

C1: convergent contact point one with directed 45° angle towards articular pillar for cervical manipulation therapy C2: convergent contact region two for optional transverse process contact with directed posterior-to-anterior movement for cervical manipulation therapy C3: convergent contact region three for optional soft tissue contact with directed posterior-to-anterior movement for cervical manipulation therapy Tsp: thoracic spinous process/ midline in vertical plane Tfj: zone for thoracic facet joints and costovertebral joints in vertical plane Ttvp: zone for costotransverse joints in vertical plane T1: convergent contact region one with directed inferior-to-superior and posterior-to-anterior movement for thoracic manipulation therapy and additional glide movement for costovertebral joint/rib head T2: convergent contact region two with directed posterior-to-anterior and glide movement for costotransverse joint manipulation therapy T3: convergent contact region three on cervical skin patch for optional contralateral spinous process contact with directed lateral to medial movement at posterior-to-anterior angle for thoracic manipulation therapy Lsp: lumbar spinous process/midline in vertical plane Lfj: one for lumbar facet joints in vertical plane Lx: marks L1 in vertical plane Ly: marks L3 in vertical plane L1: convergent contact region one with directed posterior-to-anterior movement for lumbar manipulation therapy L2: convergent contact region two for optional facet joint contact with directed posterior-to-anterior movement for lumbar manipulation therapy L3: convergent contact region three for optional contralateral spinous process contact with directed lateral to medial movement at posterior-to anterior angle for lumbar manipulation therapy PSISlevel: marks the level of the posterior superior iliac spine in horizontal plane SI: sacroiliac joint in vertical plane SIx: marks Simi on PSISIevel in 45° plane Sly: marks SIm2 on Lsp in 45° plane SIz: marks SI1 and SI2 in 45° plane SIm1: marks initial point of placement for lumbar skin patch on posterior superior iliac spine for sacroiliac joint manipulation therapy SIm2: marks final point of placement for lumbar skin patch on Lsp for sacroiliac joint manipulation therapy SI1: convergent contact region one with directed 45° angle from Lsp and along ipsilateral midline of femur at 45° hip flexion for sacroiliac joint manipulation therapy SI2: convergent contact region two for optional sacroiliac joint contact with directed 45° angle from Lsp and along ipsilateral midline of femur at 45° hip flexion for sacroiliac joint manipulation therapy As shown in FIGS. 4, 5 and 6, each skin patch may include a laminate body (12) which comprises an operatively upper or outer release liner (14) and an operatively lower or inner release liner (16). An intervening skin-engageable pad (18) may be sandwiched between the two liners. The skin-engageable pad (18) may be resiliently deformable, allowing it to conform in use to the morphology of a finger or other manipulation member such as an AAI stylus (not shown).

The skin-engageable pad (18) may comprise a carrier substrate (such as a foam pad) having opposed adhesive sides. The foam pad may carry a dry adhesive on its operatively outer face and a conventional, pressure-sensitive adsorbent adhesive on its operatively inner face. Prior to first use, the dry adhesive may be covered by the upper release liner (14) and the adsorbent adhesive may be covered by the lower release liner (16).

The upper release liner (14) may comprise a transparent PVC plastic covering that can be peeled off prior to use, thereby to expose the dry adhesive material, which may then be contacted with and engaged by the practitioner's fingers or hand, or with an AAI stylus. The PVC covering may inhibit soiling and possible desensitization of the dry adhesive prior to first use.

The upper release liner (14) may carry indicia in the form of markings or shapes for marking the targeted anatomical landmarks based on the dimensions and surface anatomy of the specific spinal segment, taking account of spinal manipulation therapy techniques.

The skin-engageable pad of each skin patch (10A, 10Bi, 10Bii and 10C) may be configured to be secured to a patient's skin using the operatively inner or lower adhesive layer, at an anatomical region which corresponds to the spinal segment that is to be manipulated.

The operatively lower release liner (16) may be peeled off prior to first use, to permit the skin-engageable pad to be adhered to the patient's skin after the pad has been positioned as directed and guided by the markings and other indicia.

Each of the release liners may have a protruding tab (20) to facilitate peeling of the liner from its respective adhesive layer.

The skin patches (10A, 10Bi, 10Bii, 100) may bear markings (23). These markings, together with other indicia such as the shape and dimensions of each type of patch, may be configured to indicate the relevant spinal segment which is designated for the skin patch concerned, and to guide a user in the application, positioning, alignment and other aspects of use of the patch. The markings (23) may also facilitate the cutting of the body (12) from a laminate material to form each type of skin patch.

Once a skin patch (10A, 10Bi, 10Bii, 100) has been secured in position on the subject's skin, the protective upper release liner (14) may be removed to expose the layer of biomimetic dry adhesive so that spinal adjustment can be effected proximate the targeted spinal segment. Adjustment may be effected by applying pressure to the dry adhesive using the manipulation member. The dry adhesive may be pressure-actuated and pressure sensitive. It may be configured to increase the coefficient of friction between itself and the manipulation member as the applied pressure increases, thus facilitating the application of a high-velocity, low amplitude thrust to the spinal segment with increased precision.

The resiliently deformable carrier substrate of the skin-engageable pad (18) may conform to the morphology of the manipulation member, thereby increasing the maximum amount of pressure that can be applied to the dry adhesive and promoting the grip of the manipulation member on the adhered pad (18).

A large interindividual variety may exist in the geometry, dimensions, and biomechanical properties of anatomical features owing to differences in patient size, bone mineral density, degenerative changes and age. Thus, the dimensions of the skin patches and skin-engageable pads designated for a specific anatomical region may be based on average dimensions of the relevant anatomical region of a human adult. The following anatomical dimensions may be considered, for example: vertebral body height posterior, intervertebral disc height, upper end-plate width, transverse process length, spinous process length, spinous process height, and width of spinous process. Examples of such dimensions may be found in the literature, e.g. Busscher, I., Ploegmakers, J. J., Verkerke, G. J. and Veldhuizen, A. G. (2010) *Comparative anatomical dimensions of the complete human and porcine spine,* 3rd ed., European spine journal, 19(7): 1104-1114.

Cervical Skin Patches

Referring to FIG. 3, in respect of the cervical spine sections, the skin patch (10A) may be dimensioned to extend between a cervical spinous process (Csp) and a posterior tubercle of a cervical transverse process (Ctvp), traversing a zone where a cervical facet joint (Cfj) is located between the cervical spinous process (Csp) and the posterior tubercle.

The skin patch (10A) may have a body (12A) which includes a main member (22A) with a first axis (24A) and a secondary member (26A) with a second axis (28A) extending from the main member (22A).

The axes may be marked on the skin patch. For example, they may be marked on an operatively upper or outer release liner of the skin patch (10A).

The main member (22A), in use, is secured to a patient's back to extend from a first end (32A), engaging the skin at or near the cervical spinous process (Csp) to a second end (30A) engaging the skin at or near the posterior tubercle of cervical transverse process (Ctvp), traversing an intervening articular pillar which extends transverse to the first axis (24A) between the cervical spinous process (Csp) and posterior tubercle of the cervical transverse process (Ctp). The secondary member (26A) may extend from the main member (22A), with the second axis (28A) and the first axis (24A) subtending an angle of between 40° and 50° between the first end (32A) of the main member (22A) and the secondary member (26A). The angle is preferably about 45°, represented by the symbol "α" in FIG. 7.

The skin patch (10A) designated for the cervical spine section may have a first contact region (C1), a second contact region (C2), and a third contact region (C3) relative to the cervical anatomy. The first contact region (C1) is utilized to direct manipulation to the articular pillar at an angle of between 40° and 50°, preferably about 45° (angle "α" in FIG. 7). The second contact region (C2) may direct contact at the transverse process in a posterior-to-anterior movement during manipulation. The third contact region (C3) may direct contact of soft tissue in a posterior-to-anterior movement during manipulation.

The contact regions may be marked on the skin patch. For example, they may be marked on an operatively upper or outer release liner of the skin patch (10A).

The skin patch (10A) may be supplied in a pair consisting of skin patches which are mirror images of each other with one patch being designated for use on one side of the cervical spinous process (Csp) and the other patch being designated for use on an opposing side of the cervical spinous process (Csp).

Thoracic Skin Patches

In respect of the thoracic spine segment, the skin patch (10Bi and 10Bii) may be dimensioned to extend between a thoracic spinous process (Tsp) and a zone where a costotransverse joint (Ttvp) is located traversing a zone where a thoracic facet joint and costovertebral joint (Tfj) are located.

In a first embodiment, the skin patch (10Bi) designated for the thoracic spine segment may have a body (12Bi) which includes a first member (22Bi) having a first axis (24Bi) and a second member (26Bi) with a second axis (28Bi) substantially parallel to the first axis (24Bi). The first member (22Bi) and the second member (26Bi) may be connected to each other by a transverse member (34Bi), with an axis (36Bi) substantially perpendicular to the first axis (24Bi) and the second axis (28Bi), which extends from the first member (22Bi) to the second member (26Bi) and continuing to extend beyond the second member (26Bi). The axes may be marked on the skin patch. For example, they may be marked on an operatively upper or outer release liner of the skin patch (10Bi).

The first member (22Bi) in use may be secured to a patient's back to at or near the zone for the thoracic facet joint and the costovertebral joint (Tfj), with the first axis (24Bi) following a substantially vertical line of the zones of each successive thoracic facet joint and costovertebral joint (Tfj) in the patient's spine. The second member (26Bi), in use, may engage the skin at or near the zone of the costotransverse joint (Ttvp) with the second axis following a substantially vertical line of the zones of each successive costotransverse joint (Ttvp) in the patient's spine. The transverse member (34Bi) extends between the first member (22B) and the second member (26Bi) and, in use, may engage the skin at or near the thoracic spine process (Tsp).

The first embodiment of the skin patches designated for the thoracic spine section may include a first contact region (T1) and a second contact (T2). The first contact region (T1) may direct posterior-to-anterior movement and gliding movement at the zone of the thoracic facet joints and the costovertebral joint (Tfj). The second contact region (T2) may direct posterior-to-anterior movement and glide movement in the zone of the costotransverse joint (Ttvp).

The contact regions may be marked on the skin patch. For example, they may be marked on an operatively upper or outer release liner of the skin patch (10Bi).

The second embodiment of the skin patch (10Bii) designated for the thoracic spine segment may have a body (12Bii) which includes a main member (22Bii) with a first axis (24Bii) and a secondary member (26Bii) with a second axis (28Bii) extending from the main member (22Bii). The axes may be marked on the skin patch. For example, they may be marked on an operatively upper or outer release liner of the skin patch (10Bii).

In use, the main member (22Bii) may be secured to a patient's back to extend from a first end (30Bii), engaging the skin at or near the thoracic spinous process (Tsp) and a second end (32Bii) engaging the skin at or near the zone for the costotransverse joint (Ttvp), traversing the zone for the thoracic facet joint and the costovertebral joint (Tfj) which extends transverse to the first axis (24Bii) between the thoracic spinous process (Tsp) and the zone for the costotransverse joint (Ttvp). The secondary member (26Bii) may extend from the main member (22Bii), with the first axis (24Bii) and the second axis (28Bii) subtending an angle of between 35° and 55° between the first end (30Bii) of the main member and the secondary member (26Bii). Preferably the angle is about 45°.

The skin patch (10Bii) may have a convergent third contact region (T3) for optional contralateral spinous process contact. In use, this region may direct lateral to medial movement at a posterior-to-anterior angle during manipulation of a thoracic spinal segment.

The skin patches (10Bi and 10Bii) may each be supplied in a pair consisting of skin patches which are mirror images of each other, with one patch of each pair being designated for use on one side of the thoracic spinous process (Tsp) and the other patch of each pair being designated for use on an opposing side of the thoracic spinous process (Tsp).

Lumbar Skin Patches

The skin patch (10C) designated for the lumbar spine section or the sacroiliac joint may be dimensioned such that, in a first, third and fourth orientation, it may extend from the lumbar spinous process (Lsp) past the zone for the lumbar facet joint (Lfj) or, in a second orientation, extend from a zone for a lumbar facet joint (Lfj) past the spinous process (Lsp).

The skin patch (10C) may have a body (12C) which includes a first axis (24C) and second axis (28C) transverse to the first axis (24C). The axes may be marked on the skin patch. For example, they may be marked on an operatively upper or outer release liner of the skin patch (10C).

In the first orientation, the body (12C) is secured to the skin of the patient's back at anatomical regions so that the first axis (24C) overlies a vertical plane (Lx) located substantially halfway between the lumbar spinous process (Lsp) and the zone of the lumbar facet joint (Lfj), with the body (12C) extending beyond the zone of the lumbar facet joint (Lfj).

In the second orientation, the body (12C) is secured to the patient's back so that the first axis overlies a vertical plane (Ly) which extends between the zone of the lumbar facet joint (Lfj) and Lx.

In the third and fourth orientations, the body (12C) may be secured to the patient's back at a location where most of the body (12C) is positioned below the PSIS level, where a sacroiliac joint is located within a vertical plane (SI) that is contiguous with the zones of successive lumbar joints in a spine. In the third orientation, the first axis (24C) may form an inclusive angle with SI of between 40° and 50°, and the second axis (28C) may form an inclusive angle of between 40° and 50° with the lumbar spinous processes (Lsp). Preferably the angles are each about 45°.

The skin patch (10C) may have a first contact region (L1), a second contact region (L2), a third contact region (L3), a fourth contact region (SI1) and a fifth contact region (SI2).

The contact regions may be marked on the skin patch. For example, they may be marked on an operatively upper or outer release liner of the skin patch (10C).

The first contact region (L1) may direct posterior-to-anterior movement during manipulation of a lumbar spinal segment. The second contact region (L2) may direct posterior-to-anterior movement at the lumbar facet joint. The third contact region (L3) may direct lateral to medial movement at an angle to posterior-to-anterior movement contralateral to the lumbar spinous process (Lsp).

The fourth contact region (SI1) and fifth contact region (SI2) may direct movement during sacroiliac joint manipulation therapy. During manipulation of this joint, the markings (23) may indicate placement of the skin patches so that the body (12C) contacts the median sacral crest (a continuation of the lumbar spinous process) at a location marked SIm2 and contacts the PSIS level at a region location marked SIm1, with the first axis (24C) forming an inclusive angle of about 45° with the PSIS level.

The fourth contact region (SI1) may direct movement from the lumbar spinous process (Lsp) and along an ipsilateral midline of a femur at an angle of about 45° to the hip flexor joint. The fifth contact region (SI2) may direct movement from the sacroiliac joint (SI) to the hip flexor joint, at an angle of about 45° relative to the lumbar spinous process (Lsp), along an ipsilateral midline of the femur.

Figure 7:
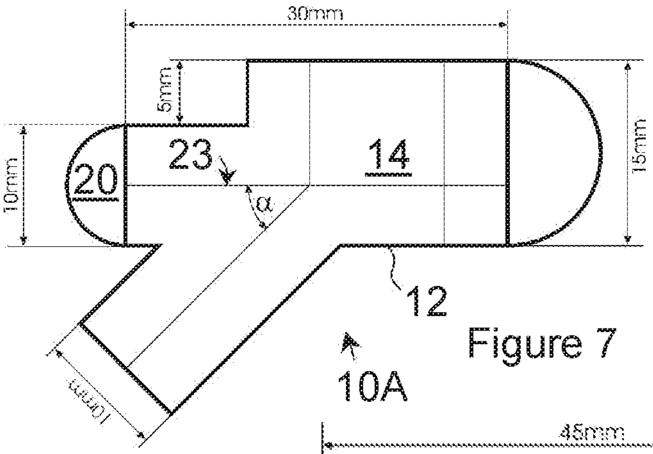
FIG. 7 is a plan view of an embodiment of the cervical skin patch of FIG. 4, showing exemplary dimensions of the patch.
Figure 8:
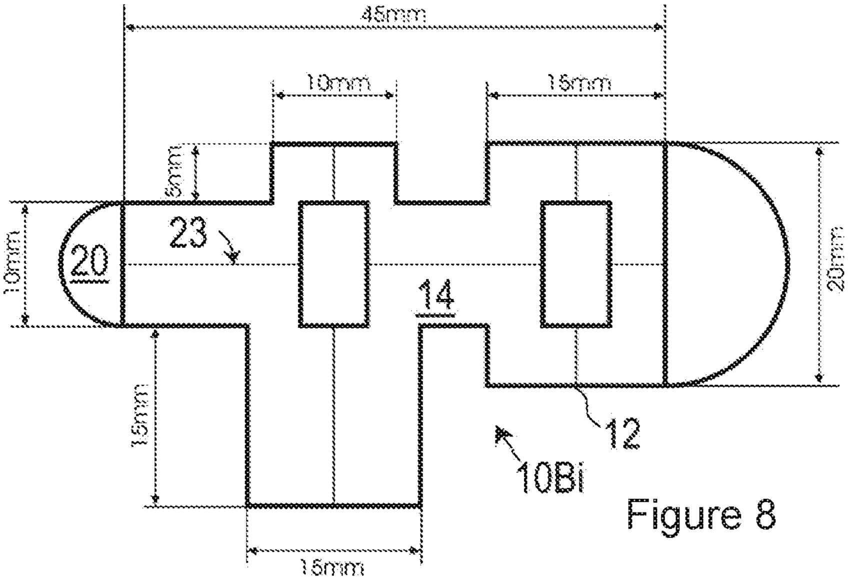
FIG. 8 is a plan view of an embodiment of the thoracic skin patch of FIG. 5, showing exemplary dimensions of the patch.
Figure 9:
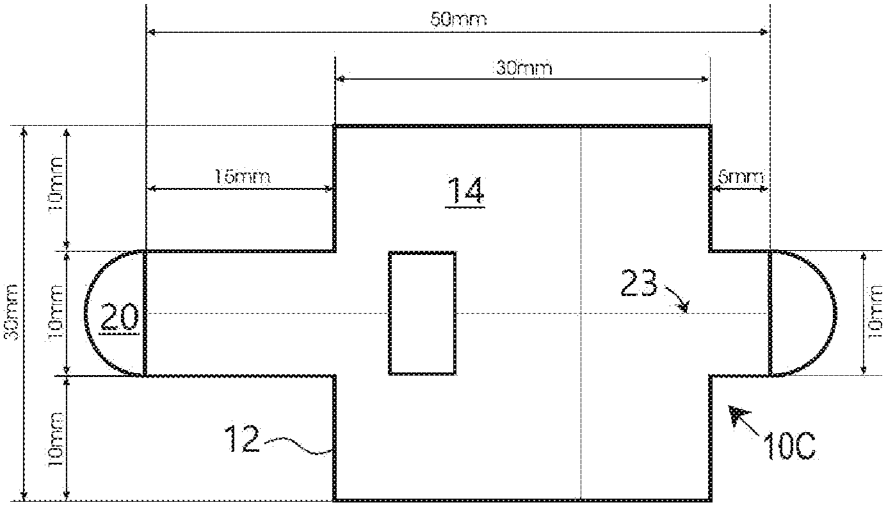
FIG. 9 is a plan view of an embodiment of the lumbar skin patch of FIG. 6, showing exemplary dimensions of the patch.

Exemplary dimensions for each of the skin patches (10A, 10B and 100) are shown in FIGS. 7 to 9, which are not to scale. The dimensions may be calculated with reference to average dimensions of a designated spinal segment that is to be manipulated. They may be selected such that they correspond generally to the dimensions and geometry of a targeted or designated spinal segment.

The symbol "α" in FIG. 7 indicates an angle of approximately 45°±5°, preferably about 45°.

In one embodiment of the skin patches, the total thickness of the laminated skin patch may be about 1 mm, of which the two release liners may each account for about 0.1 mm whilst the skin-engageable pad may account for the remainder (about 0.8 mm). It will be appreciated, therefore, that the word "pad" in the context of the skin-engageable pads must be understood widely to encompass not only pads having a visible thickness, but also thinner pads such as films and other sheet-like structures.

Testing of Skin Patches

Skin-engageable pads as disclosed herein were placed onto a subject's skin over targeted contact regions.

Figure 10:
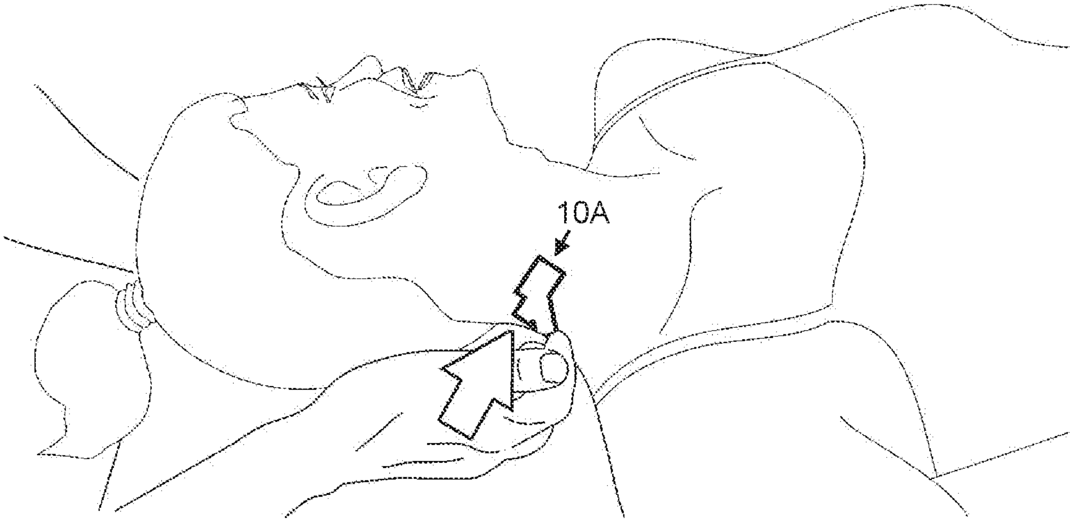
FIG. 10 is a schematic view of a skin-engageable pad of a skin patch, the pad being adhered proximate a cervical spine segment of a human subject in preparation for a chiropractic adjustment to be administered to the subject.

In a first cervical spine test, a pulling force was delivered by the practitioner to the patient's left C4/C5 vertebral segment of the cervical spine by using a fingertip contact of the practitioner's middle finger onto the skin-engageable pad of a cervical spinal embodiment of the disclosed skin patch adhered to the patient's contralateral articular pillar. By way of example only, FIG. 10 illustrates schematically how the skin-engageable pad of a cervical skin patch (10A) may be applied to a cervical spine segment of a subject for purposes of administering an adjustment to this region.

In a first thoracic spine test, a thrust force was delivered by the practitioner to the patient's right T9/T10 vertebral segment of the thoracic spine by using a reinforced-broad contact over the hypothenar eminence of the practitioner's hand onto the skin-engagable pad of a thoracic embodiment of the disclosed skin patch adhered to the patient's ipsilateral costovertebral joint-rib head.

In a first lumbar test, a thrust force was delivered by the practitioner to the patient's left sacroiliac joint at L4/L5 vertebral level of the lumbar spine by using a broad contact over the hypothenar-pisiform eminence of the practitioner's hand onto the skin-engagable pad of a lumbar embodiment of the disclosed skin patch adhered to the patient's ipsilateral soft tissue-left gluteus maximus muscle inferior to the left posterior superior iliac spine.

Results and Discussion

In each test after administering the adjustment, one or in some cases two clearly audible joint cavitation events or popping sounds (PS) were heard and confirmed by spectrogram. In chiropractic therapy, a single (or at most double) popping sound is typically considered to be preferable to the more numerous audible-release events which frequently result when conventional, broad-contact adjustments are made.

Forces applied in conventional high-force manipulation techniques can be dispersed across several segments of a spine with increased risk of adverse physiological events. The results of the above testing suggest that the disclosed skin patches may provide enhanced grip for a chiropractor's fingers and hands, allowing firm and narrower contact to be made with the subject's skin. Tension along the skin and targeted musculoskeletal structures of the subject may result from the greater friction available, enabling the pre-load force of an SMT adjustment to engage the elastic barrier of the targeted joint. This may then permit SMT forces to be steered and to converge towards the targeted segment, promoting better control of force, precision, and accuracy.

Manufacture of the Apparatus

Components of the disclosed apparatus may be made from a polymeric material. For some components the polymeric material may have elastic and resiliently deformable properties. The polymeric material may be selected from the group consisting of liquid silicone rubber (LSR) and other flexible elastomers, silicone, latex, nitrile rubber, and polyvinyl chloride (PVC).

Components of the apparatus which require rigid properties may be manufactured from semi-flexible, tough resin materials.

Selected components may be manufactured by three dimensional printing using resin or silicone elastomers, or by injection moulding of polymeric material. High volume injection moulding of liquid silicone rubber (LSR) may be employed, for example.

Components of the apparatus may advantageously be made from medical grade, skin-friendly, hypoallergenic and durable materials.

The adhesive properties of the dry adhesive may be selected to provide low-effort attachment to and detachment from an adhered surface. The dry adhesive may be selected to have hydrophobic and self-cleaning properties. It may be selected to have a high cyclic rate.

The skin patches may be cut from sheets of flexible laminate material comprising oppositely facing adhesive layers separated by an intervening carrier substrate. Waterjet cutting may be employed. A release liner, backing or film may be superimposed over each of the adhesive layers. The order of performance of the above steps need not necessarily follow the stated sequence, however: one or both release liners may be applied before or after the cutting step.

The laminate material may comprise a double-sided adhesive foam tape or pad, or a double-sided adhesive tape or film. Optionally, at least one of the adhesive layers of the laminate material may comprise a friction-inducing component such as a dry adhesive. In such cases the method of manufacture may include a step of superimposing one of release liners over said dry adhesive. Once the liner has been placed in contact with the dry adhesive, it may be adhered to the dry adhesive simply by applying a gentle shear force to the liner.

The method of manufacturing the skin patches may further include applying indicia to at least one of the release liners, or to the skin-engageable pad itself. The indicia may be markings or shapes (or both) that are configured, in use, to guide and direct the positioning and orientation of the skin-engageable pad in relation to the designated or targeted anatomical features.

The skin-engageable pads may be made from opaque, transparent or translucent materials.

Methods

In addition to the apparatus which the invention provides, the invention also provides a method for physically manipulating a human or animal body. The method can be implemented using the disclosed apparatus. The method may be suitable for administering chiropractic adjustments and massage.

The method may involve adhering a skin-engageable pad to a skin surface of the subject. It may further involve engaging a physical manipulation member with the adhered skin-engageable pad. The pad and the adhered skin surface may then be manipulated by moving the manipulation member. The first two steps may be performed in either order.

The skin-engageable pad may be as previously described. Thus, it may include a friction-inducing component such as a dry adhesive or adsorptive adhesive, and it may be configured to conform to the morphology of the physical manipulation member.

The apparatus used for the method may be provided as a digit cover or a skin patch as herein described.

If the apparatus is provided as a skin patch, the step of adhering the skin-engageable pad to the skin surface of the subject may include aligning the skin-engageable pad with an anatomical feature of the subject with reference to indicia provided on the skin patch. The method may involve removing a release liner from the skin patch thereby to expose an adhesive layer of the skin-engageable pad for adhesion to the skin surface, then contacting the adhesive layer with the skin surface.

Some types of dry adhesives may be activated by applying a shear force through the adhesive to an engaged surface (e.g. the skin of a patient). Dependent upon the type of dry adhesive used, activation may also be achieved by applying axial or tangential forces, or by a combination of these with a shear force. The magnitude of adhesion may be generally in proportion to the shear force applied; thus, a pressure applied along the skin may activate (increase) the adhesive properties of the dry adhesive. Conversely, a release of the shear force along the skin may deactivate (decrease) the adhesive properties. When applying force to an oily or wet skin, a dry adhesive may act to inhibit sliding along the skin when compared to other gripping solutions. This may facilitate the administration of various spinal manipulation therapy techniques involving the application of shear forces and downward forces. For example, standard posterior-to-anterior cervical spinal manipulation may involve the application of a shear force followed by a downward force. Manipulation of the upper thoracic spine by way of contralateral contact on the spinous process with a lateral to medial directed force may involve the application of a downward force only. Manipulation of the costotransverse joints may involve the application of a shear force only.

During use of the disclosed apparatus, a gentle, mild to moderate axial fingertip pressure may be expected to increase adhesion of the skin-engageable pad to the skin. Conversely, a decrease in the applied axial fingertip pressure may be expected to decrease the adhesion. Variations in the angle of the skin-engageable pad relative to the skin (and hence the engaged surface of the dry adhesive) during applied fingertip axial pressure may also be expected to vary the degree of available adhesion of the pad to the skin. In certain modes of use of the apparatus, a flexion (bending) of a therapist's fingertip may increase the shear force applied along the patient's skin, which may in turn increase the available adhesion; whilst extension (straightening) of a fingertip and release of the applied shear force may be expected to decrease the available adhesion.

A downward fingertip pressure on the patient's skin with partial to full flexion of the fingertip, that is an increase in flexion of about 30 to 70 degrees, may be suitable to proportionally activate the dry adhesive. A decrease in fingertip pressure on the patient's skin with partial to full extension of the fingertip, that is an increase in extension of about 30 to 70 degrees, may be suitable to proportionally deactivate the dry adhesive.

The following is a set of exemplary steps which illustrate how a manipulative therapist (MT) may use the disclosed skin patch to administer a spinal adjustment to a patient:

1) The MT first diagnoses and identifies a spinal segment or joint of the patient that requires palpation and adjustment and selects an appropriate skin patch for that segment or joint.
2) The MT cleans the patient's skin with alcohol to enhance gripping capability.
3) Optionally the MT may take this opportunity to familiarize him- or herself with the markings (23) provided on the upper transparent PVC release liner (14) of the skin patch.
4) The MT peels off the lower release liner (16) to expose the lower adhesive side of the skin-engageable pad (18).
5) The MT orientates and positions the skin-engageable pad (18) by following the direction and guidance provided by the markings (23), then adheres the pad (18) to the patient's skin.
6) The MT removes the upper release liner (14) of the skin patch to expose the dry adhesive side of the skin-engageable pad (18).
7) The MT sets up the patient's body and the targeted spinal segment or joint in a position as required for the relevant adjustment.
8) The MT applies a hand opposite the intended manipulative hand, to a suitable position on the patient in accordance with the MT's preferred SMT techniques.
9) The MT gently contacts the dry adhesive on the top side of the pad (18) with one or more of his or her fingers (or other surfaces) of the manipulative hand.
10) Without removing his or her gentle pressure and contact with the dry adhesive in the initial contact region, the MT then applies a gentle shear force along the patient's skin in the direction of the targeted joint orientation, as directed by the specific design of the respective skin patch. The shear force may activate (increase) the adhesive gripping capabilities of the dry adhesive, tightening the skin and applying tension along the targeted spinal segment or joint structure. The end of the initial passive range of motion of the segment or joint may define the SMT pre-load force before the HVLA thrust or pulling force is delivered.
11) Depending upon the specific SMT technique being used and the segment or joint being targeted, an added downward pressure at a predetermined angle can be applied after the shear force has been applied, and before the HVLA thrust or pulling force is delivered, so that the dry adhesive may further inhibit sliding of the MT's manipulative contact along the subject's skin to accommodate the required-specific HVLA force.
12) Without losing the applied pressure, the MT then delivers a HVLA thrust or pulling force in the direction of the targeted joint orientation and at a required angle as steered by the specific design of the respective skin patch. The MT may employ his or her preferred SMT techniques for the delivery. The skin patch may permit a level of force to be used which is below the force levels typically required for conventional SMT performed without such patches.
13) Following the administration of the adjustment, the MT gently releases the applied pressure and contact with the patient's skin, and passively moves the patient's body to a resting position with the aid of the MT's opposite hand.
14) Finally, the MT gently removes the used pad (18) from the patient's skin and disposes of it.

In a further mode of performing the disclosed physical manipulation method, two separate skin-engageable pads from two separate skin patches may be adhered to the body, each skin-engageable pad being adhered proximate to, and orientated relatively to, a respective one of a plurality of adjacent targeted anatomical features of the subject. The method may then include separately and successively manipulating the targeted anatomical features by moving the manipulation member engaged with each adhered skin-engageable pad, thereby to cause a popping sound to emanate from each said adjacent anatomical feature. The adjacent targeted anatomical features may comprise adjacent vertebral segments of a spine of the subject. By way of example, two separate and successive interventions or adjustments, employing two separate skin patches, may be administered separately and successively, zero (0) and one (1) vertebral segments apart, and may cause separate popping sounds to emanate, one for each intervention.

In conventional spinal manipulation therapy, it is unlikely for separate adjustments to be administered on two vertebral segments which are directly next to each other, and cause a popping sound for each of the vertebral segments individually. This is owing to the fact that this type of adjustment lacks accuracy causing multiple vertebral segments to "cavitate" or produce several popping sounds from a single adjustment. Spinal manipulation using the presently disclosed physical manipulation apparatus may allow for separate adjustments to be delivered to individual vertebral segments that are directly next to each other and to produce separate popping sounds for each one. The accuracy of an adjustment may therefore be correlated to the number of vertebral segments intervening between two targeted vertebral segments and the ability to "cavitate" both targeted vertebral segments separately and successively.

By comparison with conventional chiropractic methods, the enhanced grip capability of the disclosed apparatus may permit narrower contact regions on a patient's body to be used to deliver an adjustment. Thus, the required area of contact may be narrowed down to a contact area corresponding to fingertips, instead of the conventionally broader contact surfaces on the hands of chiropractors or other physical therapists. The contact regions on the patient's body may accordingly be made more specific and in closer proximity to targeted joints, muscles and other anatomical landmarks. The precision of an adjustment may be enhanced in terms of magnitude, direction and location. The required magnitudes and amplitudes of force may be lower than in conventional practice.

These features of the disclosed apparatus and method may permit lower force and shorter levers to be used. On the other hand, the enhanced grip of the chiropractor's hand on a patient's skin may permit larger forces to be applied, if required, with less risk of slipping. Also, the disclosed apparatus and method may slow the progression of fatigue experienced by a practitioner.

As a result of the above, the specificity, efficacy, reliability and safety of manual manipulation therapies may be promoted. The incidence of side-effects and adverse events resulting from adjustments may be reduced.

The disclosed apparatus and method may facilitate the targeting and manipulation of physical features selected from the group consisting of spinal joints, intervertebral joints, zygapophyseal joints, synovial joints, extremity joints, skeletal joints, soft tissues, muscles, tendons, ligaments, skin, and bodily organs. They may be suitable for administering a wide variety of musculoskeletal manipulation therapies, including chiropractic therapy, SMT (including HVLA SMT), joint manipulation and mobilization therapy, augmentation soft tissue mobilization, and conservative management. They may offer an alternative to low-force mechanical chiropractic techniques such as Activator Methods or the use of AAI devices. They may be applied for correcting misalignments of skeletal joints having dysfunctional biomechanics or sensory input, and for manipulating soft-tissue associated with such joints. They may be suitable for use in paediatric, geriatric, animal and equine chiropractic and physical therapies, orthopaedic surgeries and neurosurgeries; musculoskeletal traction therapies, acupressure, massage and other soft tissue therapies, and reflexology.

The apparatus and method may also find application in the treatment of patients presenting with a low-pain threshold, or obese patients and patients who may have difficulty with receiving conventional high-force SMT.

Therapists in fields such as osteopathy or physiotherapy, and medical professionals employing orthopedic manipulation therapies, may find the apparatus and methods suitable for use in modified chiropractic adjustment therapies and techniques. Practitioners and physical therapists in numerous other fields of endeavor may similarly find the disclosed apparatus and methods advantageous.

The apparatus and method may find application in clinical research, such as research to verify that an SMT intervention was administered to an intended spinal segment.

For convenience the disclosed apparatus and method may be referred to as Augmentation Manipulative Therapy™ (AMT). The disclosed digit covers may be referred to as ChirónPrime™ and the disclosed skin patches may be referred to as ChirónTape™.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise:

The word "comprise" or variations thereof such as "comprises" or "comprising" will be understood to imply the inclusion of a stated integer or group of integers but not the exclusion of any other integer or group of integers.

The word "digit" will be understood to mean a biological part selected from the group consisting of fingers, thumbs, and toes. The meaning of the term shall also extend to similar structures providing equivalent functionality, and to manipulation members selected from the group consisting of implements, tools, levers and aids with structures similar to such biological parts, whether jointed or not, the structures or members being configured to be operable to perform musculoskeletal manipulation.

The word "musculoskeletal" and variations thereof will be understood to have their widest meaning and, without limitation thereto, will include reference to the spine, vertebrae, skeletal joints, muscles, tendons, ligaments, synovial regions, soft-tissues and skin of human or animal subjects. The term shall include reference to the musculature or arrangement of muscles surrounding joints and the skeleton, including cervical spine segments, thoracic spine segments, lumbar spine segments; sacroiliac joints, costovertebral joints, costotransverse joints, zygapophyseal joints, intervertebral joints, skeletal joints in general, and soft-tissue.

The phrase "musculoskeletal manipulation" and variations thereof such as "manipulation" will be understood to have their widest meaning, which shall not be limited to manipulation carried out directly by hand. Without limitation thereto, the terms shall include reference to any mechanical thrusts or pulling actions administrable to the body of a human or animal subject, such as manipulative adjustments or massaging of the spine, vertebrae, skeletal joints, muscles, tendons, ligaments, synovial regions, soft-tissues, or skin, irrespective of whether such actions are performed directly by hand or with the agency of a suitable implement, tool or aid.

The word "therapist" will be understood to have its widest meaning and, without limitation thereto, will include reference to a therapist selected from the group consisting of chiropractors, physiotherapists, osteopaths, masseurs, masseuses, and other physical therapists.

The invention claimed is:

1. A set of physical manipulation apparatuses for performing spinal manipulation therapy upon a human or animal subject, each apparatus comprising:

a skin patch engageable with a skin surface of a human or animal subject, the skin patch comprising, a skin-engageable pad configured to conform to a morphology of at least one physical manipulation member including at least one of a human hand or a chiropractic activator, and two release liners superimposed, respectively, on opposite sides of the skin- engageable pad, wherein the skin-engageable pad comprises a friction-inducing component comprising a biomimetic dry adhesive, wherein the skin-engageable pad defines oppositely facing sides separated from each other by an intervening carrier substrate, and wherein one of the sides comprises an adhesive layer and the other comprises the biomimetic dry adhesive, and wherein, the set includes at least two distinct skin patches differing in at least one of size or shape, and sized to align with a distinct two or more of: a cervical spinal region of the human or animal subject, a thoracic spinal region of the human or animal subject, or a lumbar spine and sacroiliac joint region of the human or animal subject.

2. A method of physically manipulating a body of a human or animal subject, the method comprising the steps of:

(i) utilizing a physical manipulation apparatus for performing spinal manipulation therapy upon a human or animal subject, said apparatus comprising a skin patch engageable with a skin surface of a human or animal subject, the skin patch comprising, a skin-engageable pad configured to conform to a morphology of at least one physical manipulation member including at least one of a human hand or a chiropractic activator, and two release liners superimposed, respectively, on opposite sides of the skin-engageable pad, wherein the skin-engageable pad comprises a friction-inducing component comprising a biomimetic dry adhesive, wherein the skin-engageable pad defines oppositely facing sides separated from each other by an intervening carrier substrate, and wherein one of the sides comprises an adhesive layer and the other comprises the biomimetic dry adhesive;

(ii) engaging the at least one physical manipulation member with the skin-engageable pad of the physical manipulation apparatus;

(iii) engaging the skin-engageable pad with a skin surface of the subject; wherein at least one of steps (ii) and (iii) comprises:

removing one of the release liners of the skin patch thereby to expose the adhesive layer of the skin-engageable pad for adhesion to the skin surface of the subject or to the at least one physical manipulation member, and contacting said exposed adhesive layer with the skin surface or the at least one physical manipulation member, respectively; and adhering at least two skin-engageable pads to the skin surface of the subject, each skin-engageable pad being adhered proximate to, and orientated relatively to, a respective one of a plurality of adjacent targeted anatomical features of the subject; and (iv) manipulating the skin-engageable pad and the engaged skin surface by moving the at least one physical manipulation member; comprising separately manipulating the targeted anatomical features by moving the at least one physical manipulation member engaged with each adhered skin-engageable pad, thereby to cause a popping sound to emanate from a region of the adjacent anatomical features.

3. The method of claim 2, wherein the skin patch includes indicia arranged to indicate either or both a required orientation of the skin patch relative to a targeted or designated anatomical feature, and a required direction of movement of the manipulation member.

4. The method of claim 3, wherein the indicia are provided on: at least one of the release liners, or the skin-engageable pad of the skin patch.

5. The method of physically manipulating the body of the human or animal subject as claimed in claim 2, wherein the step of engaging the at least one physical manipulation member with the adhered skin-engageable pad comprises engaging the biomimetic dry adhesive of the skin-engageable pad with the at least one physical manipulation member.

6. The method of physically manipulating the body of the human or animal subject as claimed in claim 2, wherein the adjacent targeted anatomical features comprise adjacent vertebral segments of a spine of the subject.

7. A method of manufacturing the physical manipulation apparatus of claim 2, the method comprising the steps of:

cutting the skin-engageable pad from a sheet of resiliently deformable laminate material comprising oppositely facing adhesive layers separated by an intervening carrier substrate to which the adhesive layers are fixed, wherein one of the adhesive layers of the oppositely facing adhesive layers comprises the biomimetic dry adhesive, and wherein the skin-engageable pad is cut to a size to complement the physical manipulation member including at least one of the human hand or the chiropractic activator;

superimposing a release liner on each of the biomimetic dry adhesive layers of the skin-engageable pad; and applying indicia to either or both the skin-engageable pad and at least one of the release liners, the indicia being configured to guide positioning and orientation of the skin-engageable pad relatively to an anatomical feature of a human or animal subject.

8. The method of physically manipulating the body of the human or animal subject as claimed in claim 2, wherein the step of engaging the skin-engageable pad with the skin surface of the subject comprises engaging the biomimetic dry adhesive of the skin-engageable pad with the skin surface of the subject.

9. The method of physically manipulating the body of the human or animal subject as claimed in claim 2, which further includes providing indicia on a skin patch which comprises said skin-engageable pad and said release liners and orientating the skin-engageable pad relatively to a targeted anatomical feature of the subject with reference to the indicia.

10. The method of claim 2, wherein dimensions and configurations of the indicia are preselected with reference to dimensions and surface anatomy of the targeted or designated anatomical feature, the targeted or designated anatomical feature comprising a spinal feature.

11. The method of claim 2, wherein the indicia are arranged to indicate the targeted or designated anatomical contact region, the targeted or designated anatomical feature comprising a spinal feature.

12. The method of claim 2, wherein the adhesive layer comprises a pressure sensitive adhesive.

13. The method of physically manipulating the body of the human or animal subject as claimed in claim 2, wherein the step of manipulating the skin-engageable pad and the engaged skin surface by moving the at least one physical manipulation member comprises application of a high-velocity, low amplitude thrust to a spinal segment of the human or animal subject.

14. The method of claim 2, wherein the skin patch is sized to align with at least one of: a cervical spinal region of the human or animal subject, a thoracic spinal region of the human or animal subject, or a lumbar spine and sacroiliac joint region of the human or animal subject.

15. The method of claim 2, wherein the skin-engageable pad is configured to conform to a morphology of one finger, two fingers, three fingers, or four fingers of the human hand or a portion of a palm of the human hand, and wherein the skin-engageable pad has a largest dimension of approximately 50 millimeters (mm) or less.

16. The method of claim 2, wherein the skin-engageable pad is configured to conform to a morphology of a finger of the human hand, and wherein the indicia are arranged to indicate both a required orientation of the skin patch relative to the targeted or designated anatomical feature, and a required direction of movement of the manipulation member.

17. The method of claim 2, wherein the adhesive on the side opposite to the dry adhesive includes a wet non-biomimetic adhesive.

18. A method of physically manipulating a body of a human or animal subject, the method comprising the steps of:

(i) utilizing a physical manipulation apparatus for performing spinal manipulation therapy upon a human or animal subject, said apparatus comprising a skin patch engageable with a skin surface of a human or animal subject, the skin patch comprising, a skin-engageable pad configured to conform to a morphology of at least one physical manipulation member including at least one of a human hand or a chiropractic activator, and two release liners superimposed, respectively, on opposite sides of the skin-engageable pad, wherein the skin-engageable pad comprises a friction-inducing component comprising a biomimetic dry adhesive, wherein the skin-engageable pad defines oppositely facing sides separated from each other by an intervening carrier substrate, and wherein one of the sides comprises an adhesive layer and the other comprises the biomimetic dry adhesive;

(ii) engaging the at least one physical manipulation member with the skin-engageable pad of the physical manipulation apparatus;

(iii) engaging the skin-engageable pad with a skin surface of the subject;

wherein at least one of steps (ii) and (iii) comprises adhering the adhesive layer to a first skin surface by removing a first one of the release liners; applying a shear pressure across a second one of the release liners; and engaging the skin-engageable pad with a second skin surface by removing the second release liner; and (iv) manipulating the skin-engageable pad and the engaged skin surface by moving the at least one physical manipulation member; comprising administering at least one thrust towards the first skin surface via the skin-engageable pad.

* * * * *